Nov. 7, 1933.  L. H. E. FOX  1,933,724
COWL PIN AND ATTACHING MEANS
Filed April 18, 1931
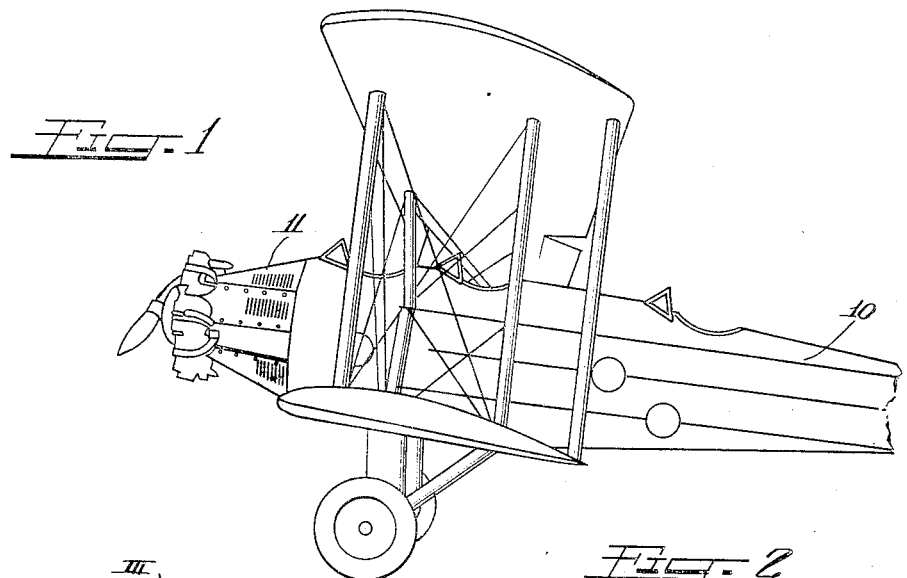
Fig. 1
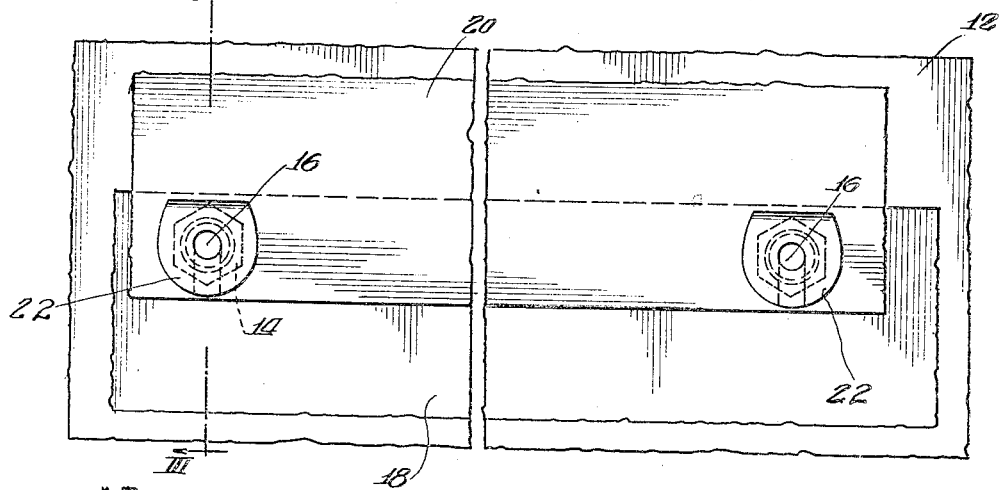
Fig. 2
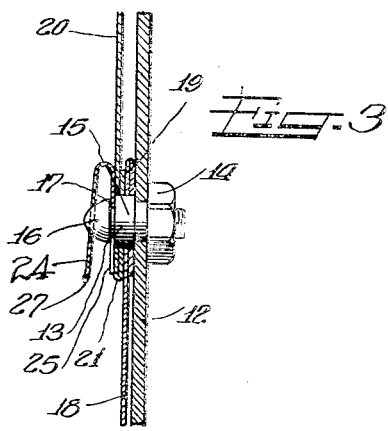
Fig. 3
Fig. 4
Inventor:
Lawrence Henry Ellis Fox.

Patented Nov. 7, 1933

1,933,724

UNITED STATES PATENT OFFICE 1,933,724

COWL PIN AND ATTACHING MEANS

Lawrence Henry Ellis Fox, Miami, Fla.

Application April 18, 1931. Serial No. 531,065

3 Claims. (Cl. 24—224)

This invention relates to cowling securing devices, and more particularly its object is to provide an improved cowl pin and attaching clip for permitting the cowling and other removable closures to be readily and quickly attached to or removed from the body of an aeroplane, whenever it is desirable to have access to the interior thereof.

There is at all times considerable vibration present in the structure of an aeroplane when in flight. This is due to not only the operating of the engine, but to the varying wind stresses, caused by the air conditions and the movement of the aeroplane through the air.

Heretofore, cowl pins have usually been drilled and a wire or pin inserted through the drilled opening after the cowling has been placed in position on the pins, but these pins being harder by necessity than the cowling usually made of aluminum alloy, the cowling becomes worn back of the pin, and the pin also becomes weakened by the vibratory action of the aeroplane. Should the engagement of one of these pins with the cowling for any cause fail the air stresses may strip the cowling from the cowl frame of the aeroplane, and cause serious accidents.

It is an object of my invention to provide means for holding the cowling firmly inwardly into bearing on the frame, to prevent so far as possible any play or lost motion of the cowling between the frame and the attaching means, and thereby overcome to a considerable degree the vibratory action of the cowling while the aeroplane is in flight. The engine vibration being at times apparently in synchronism with a natural vibratory period of the cowling, the wearing action of the retaining pins on the cowling is considerable. It is therefore an object of this invention to provide retaining means affording a broad bearing surface on the outer face of the cowling, and having resilient means associated therewith for engaging over the cowl pins, acting to positively hold the attaching means on the pins and bearing firmly against the cowling thereby obviating the wear on the cowling heretofore mentioned.

Other and further important objects of this invention will be apparent from the disclosure in the drawing and the specificaton.

The invention, in a preferred embodiment thereof, is illustrated in the accompanying drawing and hereinafter more fully described.

On the drawing:

Figure 1 is a fragmentary side elevation of an aeroplane illustrating the arrangement of the cowling and the attaching means embodying one form of the features of this invention.

Figure 2 is an enlarged fragmentary side elevation illustrating the arrangement of the cowling and the means of attaching the cowling to the frame or body of an aeroplane and embodying the features of this invention.

Figure 3 is a vertical sectional view taken substantially on the line III—III of Figure 2.

Figure 4 is an enlarged perspective view of the attaching clip of this invention.

An aeroplane 10 of the conventional type is provided with a standard cowling 11 covering the front portion of the plane adjacent the engine thereof.

The cowl 11 comprises a plurality of supporting or frame plates 12, one of which is illustrated in Figure 3. Each of the plates 12 is provided with a series of spaced apertures for receiving the intermediate portions of a plurality of cowl pins 13, each of which cowl pins is secured to the plate 12 by means of a nut 14. The cowl pin 13 is provided with an integral larger portion 15, which extends beyond one side of the plate 12 and terminates in a conical end portion 16. The cowl pin 13 is also provided with an annular groove 17 adjacent the base of the conical portion thereof (Figure 3).

The cowling 18 as normally provided has the marginal edges thereof bent back upon itself to form a thicker edge portion 19 for strengthening the cowling and is provided with a series of apertures, spaced apart so as to be in alignment with the cowl pins 13 projecting from the frame plate 12. The cowling 18 is supported by the cowl pins 13, as best illustrated in Figure 3 with the bent over edge portion thereof abutting one side of the frame plate 12. A cowling 20, similar in construction to the cowling 18, is slipped over the conical end portions of cowl pins 13 so that the thicker edge portions 21 thereof will be in overlapping abutting relation with the cowling 18 (Figure 3).

A substantially U-shaped resilient clip 22 having relatively broad faced opposed leg portions 23 and 24 respectively, provided with a U-shaped slotted portion 25 in the leg 23 thereof, and an annular apertured portion 26 in the opposed leg 24 of the clip, engage the respective cowl pins 13 with the leg portion 23 abutting the cowling 18 for maintaining the cowlings 18 and 20 firmly in position against the cowl frame 12.

It is to be noted that the end of the leg 24 of the clip 22 is flared as at 27 (Figure 3) for facilitating the moving of the clip over the conical end 16 of the cowl pin.

The clips 22 are readily and quickly slipped into engagement with the respective cowl pins 13 by simply moving the clips so that the slotted portion 25 in the leg 23 of each of the clips engage the respective groove 17 of each of the cowl pins 13 with the broad face portion of the leg 23 abutting the cowling 20. At the same time the flared end portion 27 in the opposed leg 24 of the clip slips over the end of the pin 13, with the conical end portion of the pin frictionally engaging the aperture 26 in the leg 24 of the clip, thereby firmly and safely securing the cowlings 18 and 20 against the cowl frame.

It is to be observed that the cowl pin 13 is provided with a conical end portion 16, which not only facilitates the attaching and removing of the cowlings 18 and 20 to and from the cowl frame 12, but also associates with the flared end portion 27 of the resilient clip for facilitating the insertion of the clip in engagement therewith, for maintaining the cowlings firmly in position.

From the foregoing, it is evident that I have provided a novel means of firmly securing the cowling of an aeroplane in position, and which means permit the ready and quick removal of the cowling, whenever it is desirable to gain access to the interior of the cowl compartment.

It is also apparent that I have provided a cowling securing device which is of simple and inexpensive construction, and which device is efficient in its operation, thereby eliminating objectionable features of the present cowling securing device.

Of course, it is to be understood that, although the invention is illustrated and described in detail in a single embodiment thereof, the invention is not to be thus limited, but only insofar as defined by the scope and spirit of the appended claims.

The invention is claimed as follows:

1. A fastening device comprising a pin having an annular recess adjacent one end, means at the other end of the pin, whereby the pin may be secured to a supporting member in such a position as to enable its insertion through an aperture in a member to be secured on the pin, and a U-shaped clip of resilient material, one leg of the clip being slotted to enable its insertion into straddling position in the recess, the other leg having an aperture to receive the end of the pin, said recess and end of the pin cooperating to spread the legs of the clip apart so that the end of the pin enters the aperture with a snap action.

2. A fastening device comprising a pin adapted at its inner end to be secured to a supporting member, said pin having its outer end rounded and provided with a peripheral groove inwardly disposed from the outer end, and a U-shaped resilient clip, one leg of said clip being slotted to enable its insertion into straddling position in the groove, the other leg having an aperture to receive the end of the pin, whereby the clip is held in cooperative association with the pin.

3. A fastening device comprising a pin adapted to be inserted through an aperture in a member to be secured thereon, said pin having a recess adjacent an end thereof, and a cooperating U-shaped resilient clip, one leg of the clip being slotted to enable its insertion into the recess in a straddling position with the other leg bearing against said end of the pin, said other leg having an aperture to receive the end of the pin.

LAWRENCE H. E. FOX.